(12) United States Patent
Kim et al.

(10) Patent No.: US 9,191,657 B2
(45) Date of Patent: Nov. 17, 2015

(54) IMAGE DISPLAY DEVICE

(75) Inventors: Dongun Kim, Daegu (KR); Suwoong Lee, Paju-si (KR); Chonghun Park, Paju-si (KR); Sangrae Lee, Pohang-si (KR)

(73) Assignee: LG Display Co., Ltd., Seoul (KR)

( * ) Notice: Subject to any disclaimer, the term of this patent is extended or adjusted under 35 U.S.C. 154(b) by 842 days.

(21) Appl. No.: 13/331,834

(22) Filed: Dec. 20, 2011

(65) Prior Publication Data

US 2012/0154392 A1   Jun. 21, 2012

(30) Foreign Application Priority Data

Dec. 20, 2010   (KR) .................. 10-2010-0130887
May 13, 2011   (KR) .................. 10-2011-0045202

(51) Int. Cl.
*H04N 13/04*   (2006.01)
*G02B 26/06*   (2006.01)

(52) U.S. Cl.
CPC ............ *H04N 13/0434* (2013.01); *G02B 26/06* (2013.01); *H04N 2213/001* (2013.01)

(58) Field of Classification Search
CPC ................... H04N 13/0452; H04N 13/0434
USPC ....................... 345/87, 419; 348/51
See application file for complete search history.

(56) References Cited

U.S. PATENT DOCUMENTS

2008/0129676 A1* 6/2008 Kim et al. ............ 345/99
2010/0225682 A1* 9/2010 Nakahata ............. 345/695
2010/0289884 A1* 11/2010 Kang .................. 348/58
2011/0122239 A1* 5/2011 Baik et al. ............ 348/58

FOREIGN PATENT DOCUMENTS

| CN | 1484453 A | 3/2004 |
|---|---|---|
| CN | 1885096 A | 12/2006 |
| CN | 101655625 A | 2/2010 |
| CN | 101888564 A | 11/2010 |
| EP | 2227026 A1 | 9/2010 |
| GB | 2469536 A | 10/2010 |
| TW | 201033979 A | 9/2010 |
| WO | WO 2006/097897 A1 | 9/2006 |

OTHER PUBLICATIONS

Office Action issued in corresponding Taiwanese Patent Application No. 100147498, mailed Jan. 16, 2014, 9 pages.
Office Action issued in corresponding United Kingdom Patent Application No. GB 1121947.4, mailed Apr. 20, 2012.
Office Action issued in corresponding Chinese Patent Application No. 201110429548.4, mailed Feb. 8, 2014, 10 pages.

* cited by examiner

*Primary Examiner* — Hung Dang
*Assistant Examiner* — Girumsew Wendmagegn
(74) *Attorney, Agent, or Firm* — Brinks Gilson & Lione

(57) ABSTRACT

An image display device includes a display element selectively implementing a 2D image and a 3D image and a patterned retarder. The display element includes a pixel array including a plurality of subpixels, which are respectively formed at crossings of column lines and row lines. The patterned retarder includes a plurality of first retarders, each of which transmits light from the display element as a first polarization component, and a plurality of second retarders, each of which transmits the light from the display element as a second polarization component. The first retarders and the second retarders are alternatively arranged.

13 Claims, 19 Drawing Sheets

IMAGE DISPLAY DEVICE

Pursuant to 35 U.S.C. §119(a), this application claims the benefit of earlier filing date and right of priority to Korean Application 10-2011-0045202 filed on May 13, 2011 and Korean Application 10-2010-0130887 filed on Dec. 20, 2010, the content of which is incorporated by reference herein in its entirety.

BACKGROUND

1. Field of the Invention

Embodiments of the disclosure relate to an image display device capable of implementing a two-dimensional plane image (hereinafter referred to as '2D image') and a three-dimensional stereoscopic image (hereinafter referred to as '3D image').

2. Discussion of the Related Art

With the recent development of various contents and circuit technologies, an image display device may selectively implement a 2D image and a 3D image. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

A LC shutter glasses type image display alternately displays a left eye image and a right eye image on a display element every one frame and opens and closes a left eyeglass and a right eyeglass of LC shutter glasses in synchronization with a display timing, thereby implementing the 3D image. The LC shutter glasses open only the left eyeglass during odd-numbered frame periods, in which the left eye image is displayed, and open only the right eyeglass during even-numbered frame periods, in which the right eye image is displayed, thereby making binocular disparity in a time division method. In the LC shutter glasses type image display, because the LC shutter glasses are turned on in a short period of time, a luminance of the 3D image is low. Further, a 3D crosstalk is extremely generated because of the synchronization between the display element and the LC shutter glasses and the ON/OFF conversion response characteristic.

As shown in FIG. 1, a polarized glasses type image display includes a patterned retarder 2 attached on a display panel 1. The polarized glasses type image display alternately displays left eye image data L and right eye image data R on the display panel 1 every one horizontal line and converts polarization characteristic of light incident on polarized glasses 3 using the patterned retarder 2. Through such an operation of the polarized glasses type image display, a left eye image and a right eye image may be spatially divided, thereby implementing a 3D image.

In the polarized glasses type image display, because the left eye image and the right eye image are adjacently displayed on the adjacent horizontal lines, a range of a vertical viewing angle, at which a crosstalk is not generated, is narrow. The crosstalk is generated when the left eye image and the right eye image are overlappingly displayed as one image (i.e., one of the left eye image and the right eye image) at a location of the vertical viewing angle. To prevent the crosstalk in the polarized glasses type image display, as shown in FIG. 2, a method for forming black stripes BS in an area of a patterned retarder 2 to thereby widen a vertical viewing angle of the 3D image had been proposed in Japanese Laid Open Publication No. 2002-185983. However, the black stripes BS of the patterned retarder 2 used to widen the vertical viewing angle bring about a side effect resulting in a large reduction in a luminance of a 2D image.

BRIEF SUMMARY

An image display device comprises a display element including a pixel array including a plurality of subpixels, each of which is formed at each of crossings of column lines and row lines, the display element selectively implementing a 2D image and a 3D image, and a patterned retarder including a plurality of first retarders, each of which passes through light from the display element as a first polarization component, and a plurality of second retarders, each of which passes through the light from the display element as a second polarization component, the plurality of first retarders and the plurality of second retarders being alternatively arranged, wherein when the 2D image is implemented, all of the subpixels display 2D image data, wherein when the 3D image is implemented, subpixels of (4i)th row lines display black data, where 'i' is a positive integer, subpixels of three adjacent row lines on the upper side of each of the (4i)th row lines display 3D image data of one of left and right eye images of the 3D image, and subpixels of three adjacent row lines on the lower side of each of the (4i)th row lines display 3D image data of the other of the left and right eye images.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 3 to 19B.

In the following description, a row line indicates a horizontal display line formed by subpixels, which are positioned adjacent to one another along a row direction, and a column line indicates a vertical display line formed by subpixels, which are positioned adjacent to one another along a column direction.

Figure 1:
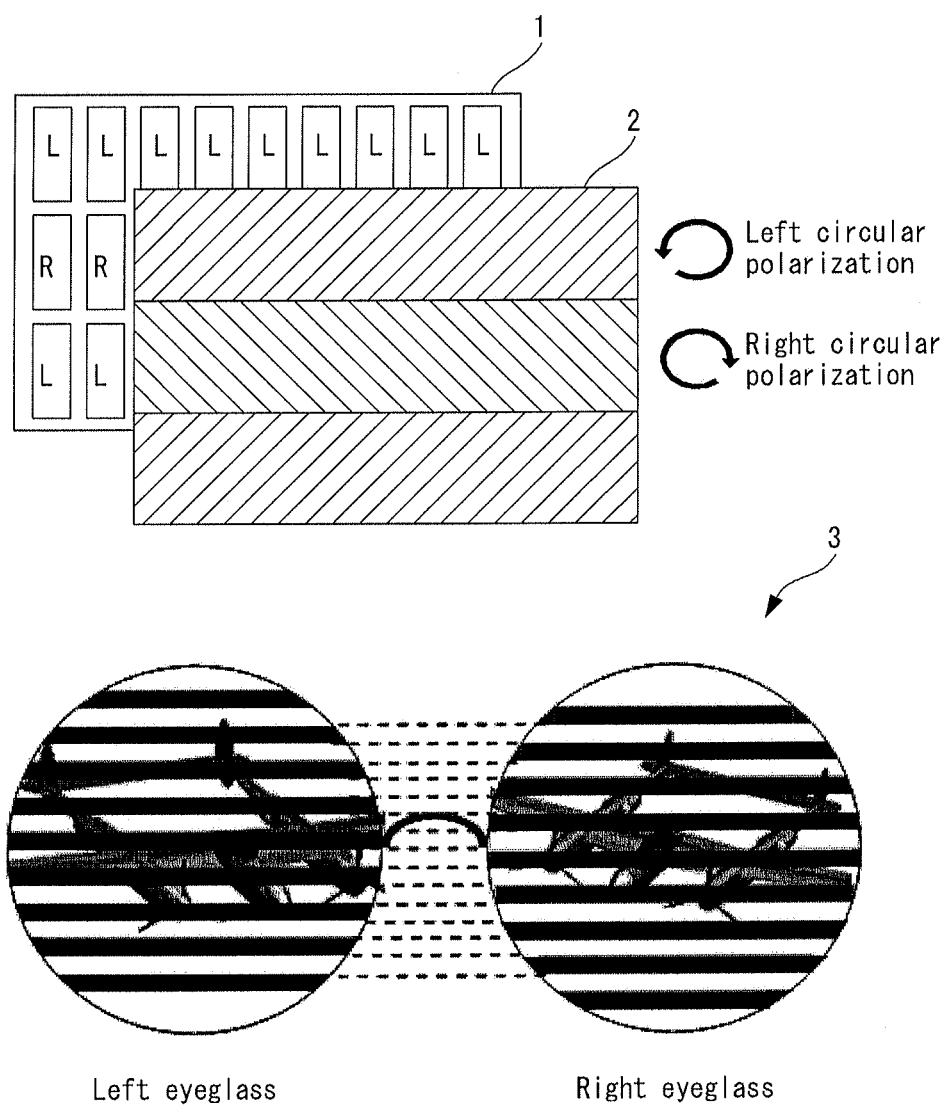
FIG. 1 illustrates a related art polarized glasses type image display.
Figure 2:
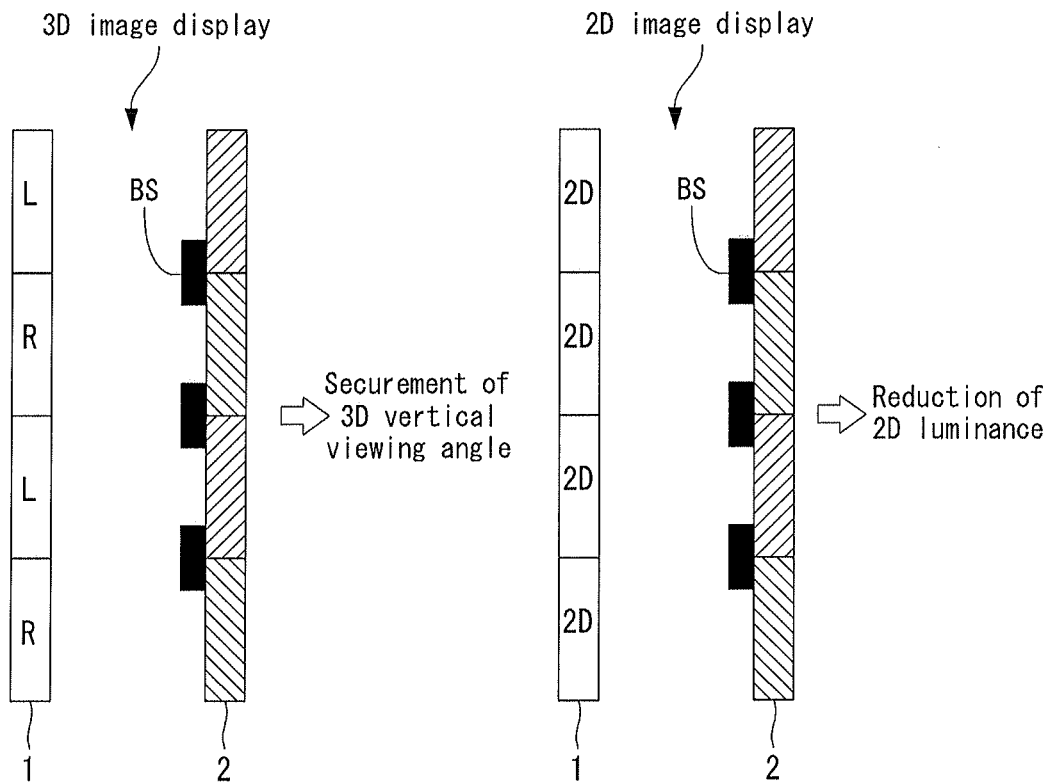
FIG. 2 illustrates a reduction in a luminance of a 2D image in a related art polarized glasses type image display.
Figure 3:
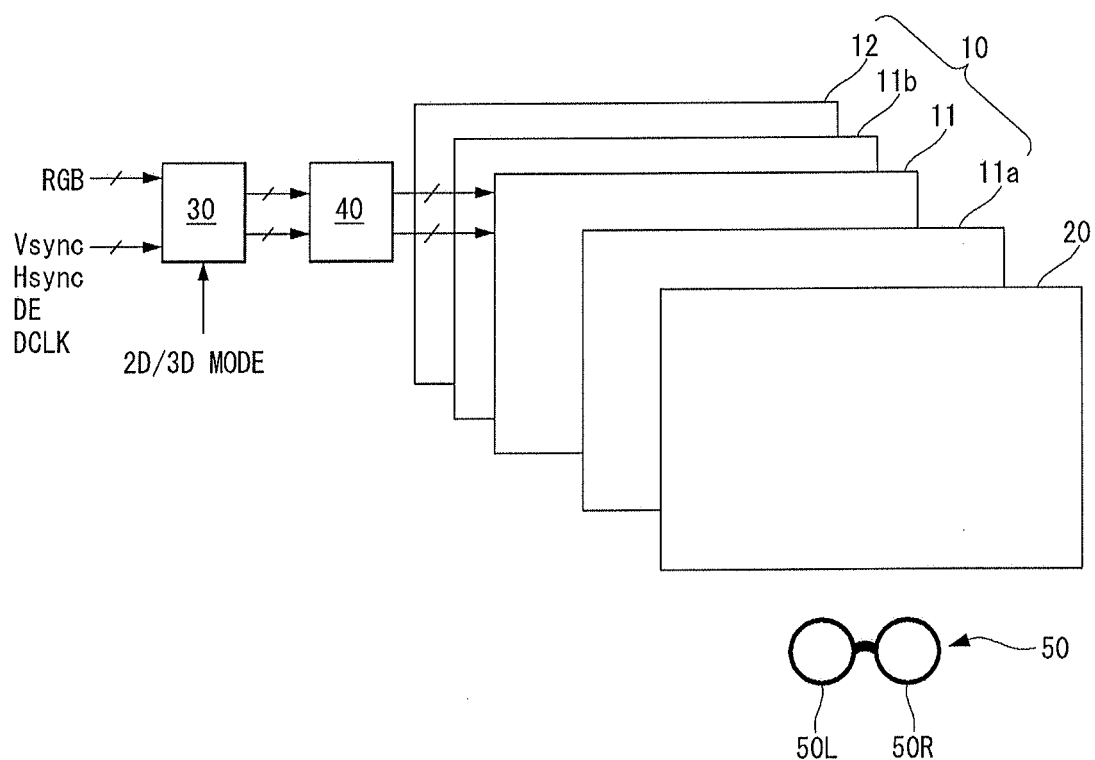
FIGS. 3 and 4 illustrate a polarized glasses type image display according to an example embodiment of the invention.
Figure 4:
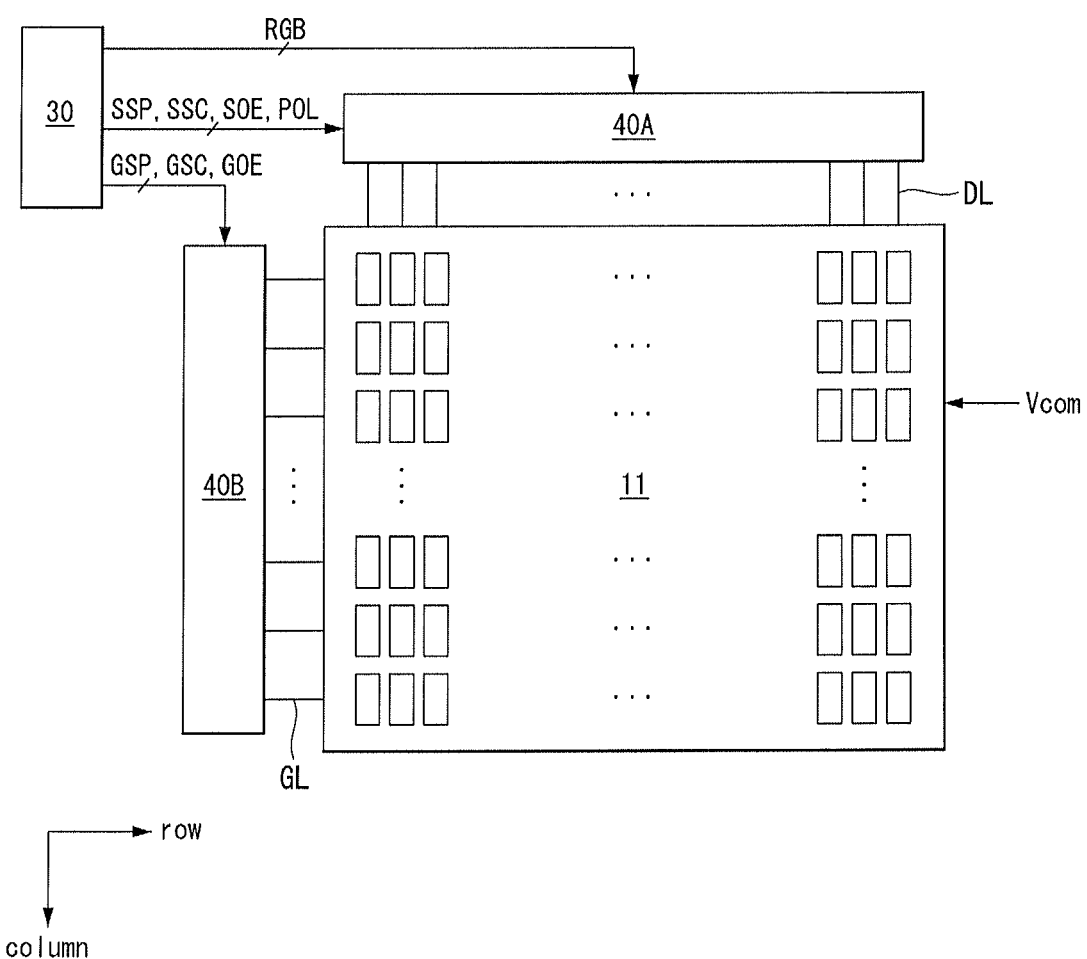

FIGS. 3 and 4 illustrate a polarized glasses type image display according to an example embodiment of the invention.

As shown in FIG. 3, an image display device according to an example embodiment of the invention includes a display element 10, a patterned retarder 20, a controller 30, a panel driver 40, and polarized glasses 50.

The display element 10 may be implemented as a flat panel display such as a liquid crystal display (LCD), a field emission display (FED), a plasma display panel (PDP), an electroluminescence device (EL) including an inorganic electroluminescence element and an organic light emitting diode (OLED) element, and an electrophoretic display (EPD). In the following description, the image display device according to the embodiment of the invention is described using the liquid crystal display as the display element 10.

The display element 10 includes a display panel 11, an upper polarizing film 11a, and a lower polarizing film 11b.

The display panel 11 includes an upper glass substrate, a lower glass substrate, and a liquid crystal layer between the upper and lower glass substrates. A plurality of data lines DL and a plurality of gate lines GL crossing the plurality of data lines DL are disposed on the lower glass substrate of the display panel 11. A plurality of subpixels are disposed on the display panel 11 in a matrix form based on a crossing structure between the data lines DL and the gate lines GL, thereby constituting a pixel array.

Black matrixes, color filters, and common electrodes are formed on the upper glass substrate of the display panel 11. The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, the common electrodes, to which a common voltage Vcom is supplied, are formed on the upper glass substrate. In a horizontal electric field driving manner such as an in-plane switching (IPS) mode and a fringe field switching (FFS) mode, the common electrodes are formed on the lower glass substrate along with pixel electrodes. A column spacer may be formed between the upper and lower glass substrates to keep cell gaps of liquid crystal cells of the display panel 11 constant.

The display panel 11 may be implemented in any liquid crystal mode as well as the TN, VA, IPS, and FFS modes. The liquid crystal display according to the embodiment of the invention may be implemented as any type liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

The patterned retarder 20 is attached to the upper polarizing film 11a of the display panel 11. The patterned retarder 20 includes a plurality of first retarders, each of which transmits light incident from the display panel 11 as a first polarization component, and a plurality of second retarders, each of which transmits the light incident from the display panel 11 as a second polarization component. The plurality of first retarders and the plurality of second retarders are alternatively arranged. Light absorption axes of the first retarders are perpendicular to light absorption axes of the second retarders. The first retarder may transmit light incident from the pixel array as left circularly polarized light, and the second retarder may transmit the light incident from the pixel array as right circularly polarized light. Thus, the first retarder of the patterned retarder 20 may be implemented as a polarizing filter converting incident light into left circularly polarized light, and the second retarder of the patterned retarder 20 may be implemented as a polarizing filter converting the incident light right circularly polarized light.

The controller 30 controls an operation of the panel driver 40 in a 2D mode or a 3D mode in response to a mode selection signal.

In the 3D mode, the controller 30 renders RGB data of the 3D image received from a system board (not shown) in conformity with a display location of the display panel 11 and then supplies the rendered RGB data of the 3D image to the panel driver 40. In the 2D mode, the controller 30 renders RGB data of the 2D image received from the system board in conformity with the display location of the display panel 11 and then supplies the rendered RGB data of the 2D image to the panel driver 40.

The controller 30 receives timing signals such as a vertical sync signal Vsync, a horizontal sync signal Hsync, a data enable DE, and a dot clock DCLK from the system board and generates control signals for controlling operation timing of the panel driver 40 using the timing signals.

A data control signal for controlling operation timing of a data driver 40A of the panel driver 40 includes a source start pulse SSP, a source sampling clock SSC, a source output enable SOE, a polarity control signal POL, and the like. The source start pulse SSP indicates a supply start time point of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 40A. The polarity control signal POL controls a polarity of a data voltage to be supplied to the liquid crystal cells of the display panel 11.

A gate control signal for controlling operation timing of a gate driver 40B of the panel driver 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 40B and sequentially shifts the gate start pulse GSP. The gate output enable GOE controls an output of the gate driver 40B.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2 and f is the input frame frequency. Hence, the controller 30 may control the operation of the panel driver 40 based on the frame frequency of (f×N) Hz. The input frame frequency is 50 Hz in a phase alternate line (PAL) scheme and 60 Hz in a national television standards committee (NTSC) scheme.

The panel driver 40 includes the data driver 40A for driving the data lines DL of the display panel 11 and the gate driver 40B for driving the gate lines GL of the display panel 11.

The data driver 40A includes a plurality of source driver integrated circuits (ICs). Each of the source driver ICs includes a shift register, a latch, a digital-to-analog converter (DAC), an output buffer, and the like. The data driver 40A latches the RGB data of the 2D or 3D image in response to the data control signals SSP, SSC, and SOE. The data driver 40A converts the RGB data of the 2D or 3D image into analog positive and negative gamma compensation voltages in response to the polarity control signal POL and inverts a polarity of the data voltage. The data driver 40A outputs the data voltage to the data lines DL, so that the data voltage is synchronized with a scan pulse (or a gate pulse) output from the gate driver 40B. The source driver ICs of the data driver 40A may be bonded to the lower glass substrate of the display panel 11 through a tape automated bonding (TAB) process.

The gate driver 40B generates the scan pulse, which swings between a gate high voltage and a gate low voltage, in response to the gate control signals GSP, GSC, and GOE. The gate driver 40B supplies the scan pulse to the gate lines GL in a line sequential format in response to the gate control signals GSP, GSC, and GOE. The gate driver 40B includes a gate shift register array, etc. The gate shift register array of the gate driver 40B may be formed in a non-display area outside a display area of the display panel 11, in which the pixel array is formed, in a gate-in-panel (GIP) manner. A plurality of gate shift registers included in the GIP type gate shift register array may be formed with along the pixel array in a process for forming the TFTs of the pixel array in the GIP manner.

The polarized glasses 50 include a left eyeglass 50L having a left eye polarizing filter and a right eyeglass 50R having a right eye polarizing filter. The left eye polarizing filter has the same light absorption axis as the first retarder of the patterned retarder 20, and the right eye polarizing filter has the same light absorption axis as the second retarder of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 11 in a space spatial manner, through the polarized glasses 50.

The image display device according to the example embodiment of the invention may have various arrangement configurations of RGB subpixels and various alignment states of the patterned retarder corresponding to the arrangement configurations.

Figure 5:
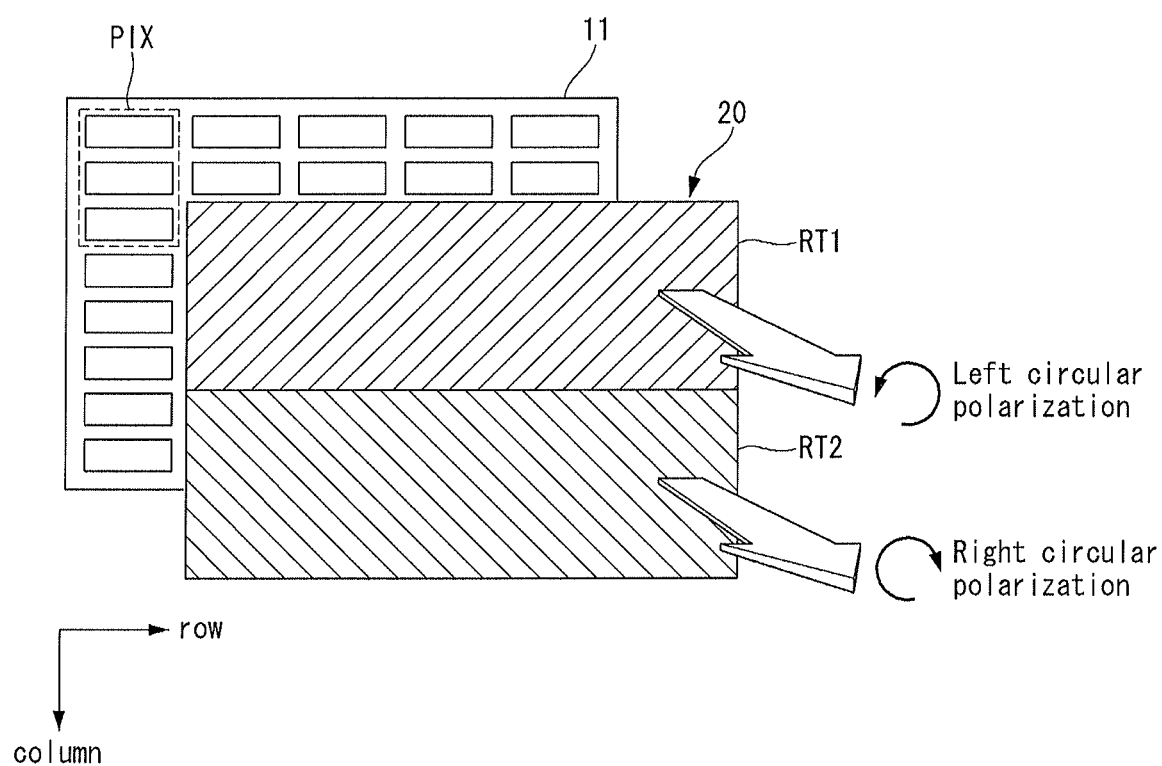
FIGS. 5 to 7 illustrate a first arrangement configuration of RGB subpixels and an alignment state of a patterned retarder corresponding to the first arrangement configuration.
Figure 6:
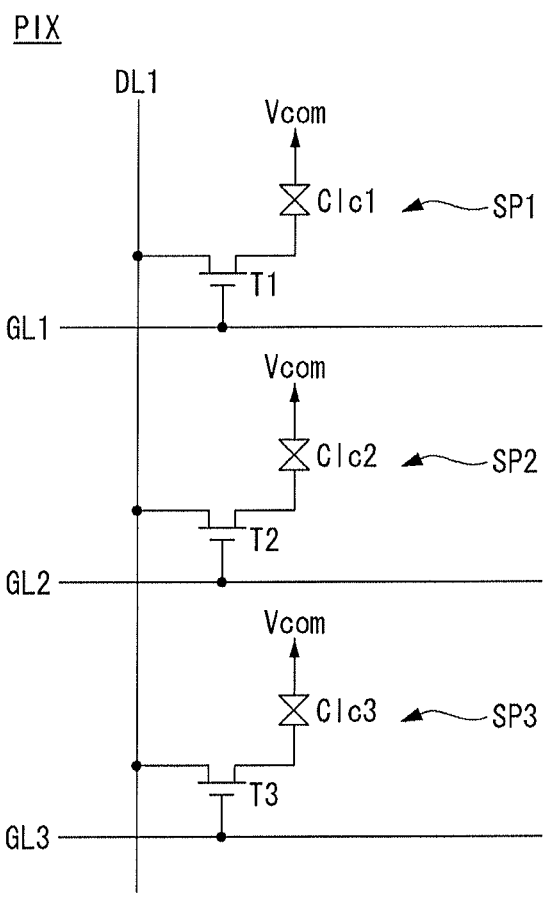
Figure 7:
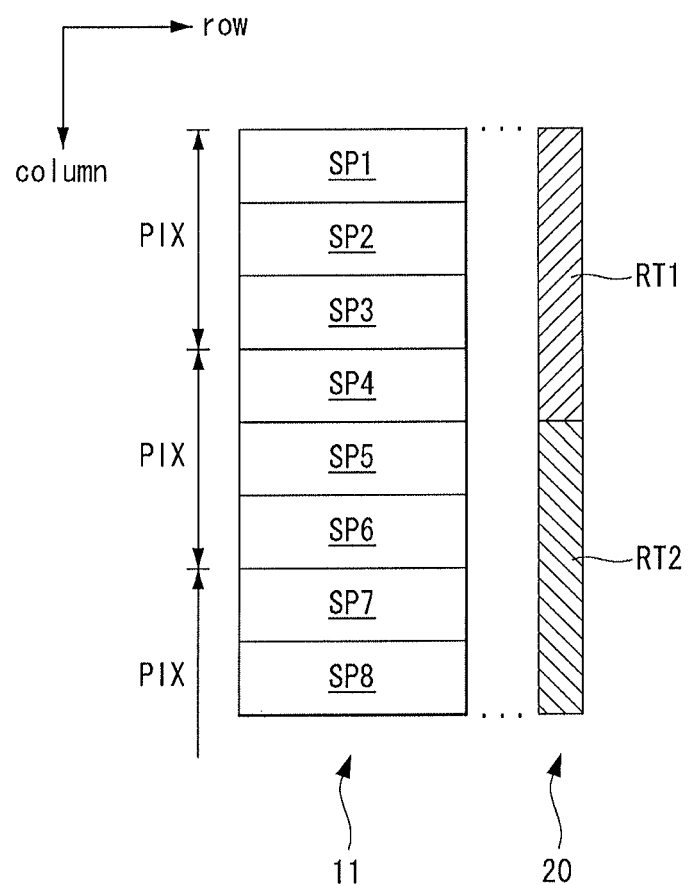

FIGS. 5 to 7 illustrate a first arrangement configuration of RGB subpixels and an alignment state of the patterned retarder corresponding to the first arrangement configuration.

The subpixels constituting the pixel array include red subpixels each including a red color filter, green subpixels each including a green color filter, and blue subpixels each including a blue color filter. As shown in FIGS. 5 to 7, the red subpixel, the green subpixel, and the blue subpixel are sequentially disposed along the column direction, thereby constituting a unit pixel PIX. One data line and three gate lines are assigned to the unit pixel PIX. For example, in the unit pixel PIX illustrated in FIG. 6, a first subpixel SP1 is formed at a crossing between a data line DL1 and a gate line GL1 and displays a red image, a second subpixel SP2 is formed at a crossing between the data line DL1 and a gate line GL2 and displays a green image, and a third subpixel SP3 is formed at a crossing between the data line DL1 and a gate line GL3 and displays a blue image.

The patterned retarder 20 is aligned on the display panel 10, so that it divides polarized light every four row lines. A plurality of first retarders RT1 and a plurality of second retarders RT2 of the patterned retarder 20 are alternately disposed along the column direction. Each of the first retarder RT1 and the second retarder RT2 is formed along the row direction in an elongated manner along an entire row, for example. Each of the first retarder RT1 and the second retarder RT2 is opposite to four row lines. For example, as shown in FIG. 7, when the first retarder RT1 is opposite to four row lines including first to fourth subpixels SP1 to SP4, the second retarder RT2 may be opposite to four row lines including fifth to eighth subpixels SP5 to SP8.

Figure 8A:
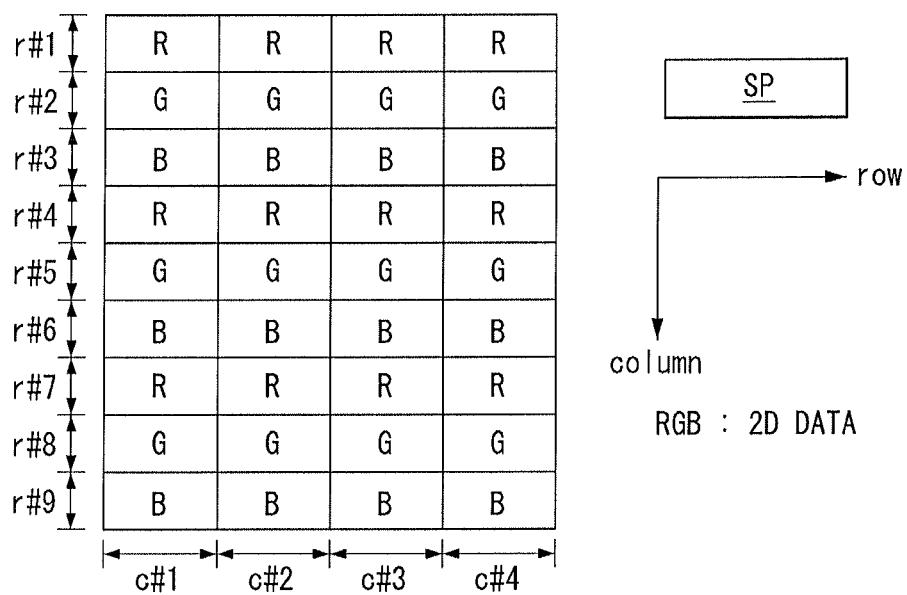
FIGS. 8A and 8B illustrate a first example of a display state of image data based on the first arrangement configuration illustrated in FIGS. 5 to 7.
Figure 8B:
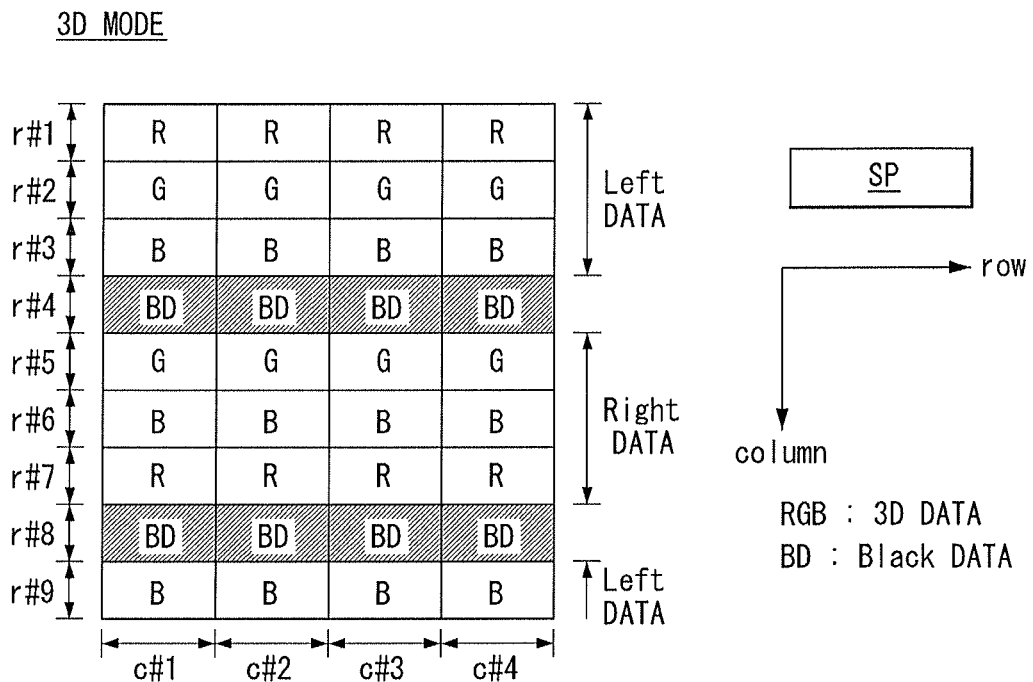

FIGS. 8A and 8B illustrate a first example of a display state of image data based on the first arrangement configuration illustrated in FIGS. 5 to 7.

As shown in FIG. 8A, in the 2D mode, the subpixels of the display panel 11 display the RGB data of the 2D image along the column direction, and a display order of the RGB data is the same in all of column lines c#1 to c#4. As a result, the subpixels of (3i−2)th row lines r#1, r#4, and r#7 crossing the column lines c#1 to c#4 display red data R of the 2D image, where T is a positive integer. Further, the subpixels of (3i−1)th row lines r#2, r#5, and r#8 crossing the column lines c#1 to c#4 display green data G of the 2D image, and the subpixels of (3i)th row lines r#3, r#6, and r#9 crossing the column lines c#1 to c#4 display blue data B of the 2D image.

As shown in FIG. 8B, in the 3D mode, the subpixels of the display panel 11 display the RGB data of the 3D image and black data BD along the column direction, and a display order of the RGB data is the same in all of the column lines c#1 to c#4. The black data BD is displayed on the subpixels of (4i)th row lines r#4 and r#8. The RGB data of the 3D image displayed along the column direction is divided into left eye image data and right eye image data with the (4i)th row lines r#4 and r#8 interposed between the left eye image data and the right eye image data. The left eye image data and the right eye image data on all of the column lines c#1 to c#4 are rendered along the column direction in order of left eye RGB data, right eye GBR data, left eye BRG data, right eye RGB data, left eye GBR data, and right eye BRG data.

As described above with reference to FIGS. 8A and 8B, the image display device according to the embodiment of the invention displays the 2D image data on all of the subpixels in the 2D mode, thereby preventing a reduction in a luminance of the 2D image. Further, the image display device according to the embodiment of the invention displays the black data BD on the subpixels of the (4i)th row lines r#4 and r#8 and secures a display interval between the left eye image and the right eye image in the 3D mode, thereby widening the vertical viewing angle of the 3D image. The subpixels of the (4i)th row lines r#4 and r#8 display the black data BD only in the 3D mode and serve as an active black stripe.

The first example illustrated in FIGS. 8A and 8B describes the first and second retarders RT1 and RT2, each of which is opposite to the four row lines, and does not limit the number of row lines opposite to each of the first and second retarders RT1 and RT2. For example, each of the first and second retarders RT1 and RT2 may be opposite to the four or more row lines. In this instance, the image display device according to the embodiment of the invention individually displays the 2D image data on all of the subpixels in the 2D mode, thereby preventing a reduction in the luminance of the 2D image. Further, the image display device according to the embodiment of the invention displays the RGB data of one of the left and right eye images on three or more row lines and displays the black data BD on the remaining one or more row lines in the 3D mode.

The number of row lines displaying the black data BD may be two or more. Hence, a vertical crosstalk may be further reduced.

Accordingly, each of the first and second retarders RT1 and RT2 is positioned opposite the row lines displaying the RGB data of one of the left and right eye images. Further, each of the first and second retarders RT1 and RT2 is positioned opposite the row lines, which displays the 2D image data in the 2D mode and displays the black data BD in the 3D mode.

The number of row lines, which are opposite to each of one first retarder RT1 and one second retarder RT2 and display the RGB data of one of the left and right eye images in the 3D mode, is not limited to three. For example, the three row lines may form a row line group, and the RGB data of the left eye image displayed on two or more row line groups and the RGB data of the right eye image displayed on two or more row line groups may be alternately disposed. In this instance, the embodiment of the invention may be configured such that the RGB data of the left eye image—the RGB data of the left eye image—the black data BD or the RGB data of the right eye image—the RGB data of the right eye image—the black data BD are opposite to one of the first and second retarders RT1 and RT2. The image display device according to the embodiment of the invention may further improve the luminance of the 3D image in the 3D mode through the configuration.

In other words, in the first example illustrated in FIGS. 8A and 8B, each of the first and second retarders RT1 and RT2 is opposite to at least four row lines, and the row lines individually display the 2D image data in the 2D mode. In the 3D mode, one or more row line groups each including the three row lines displaying the RGB data are opposite to each of the first and second retarders RT1 and RT2, and the black data BD is displayed on at least one row line.

Because the row line displaying the black data BD in the 3D mode displays the 2D image data in the 2D mode, the row line displaying the black data BD may have the same vertical width as the other row lines.

Figure 9A:
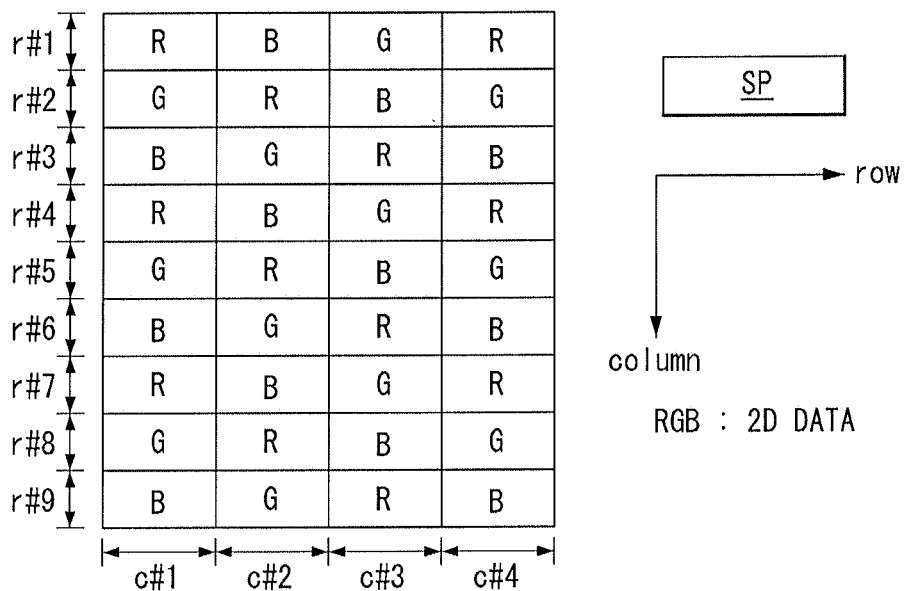
FIGS. 9A and 9B illustrate a second example of a display state of image data based on the first arrangement configuration illustrated in FIGS. 5 to 7.
Figure 9B:
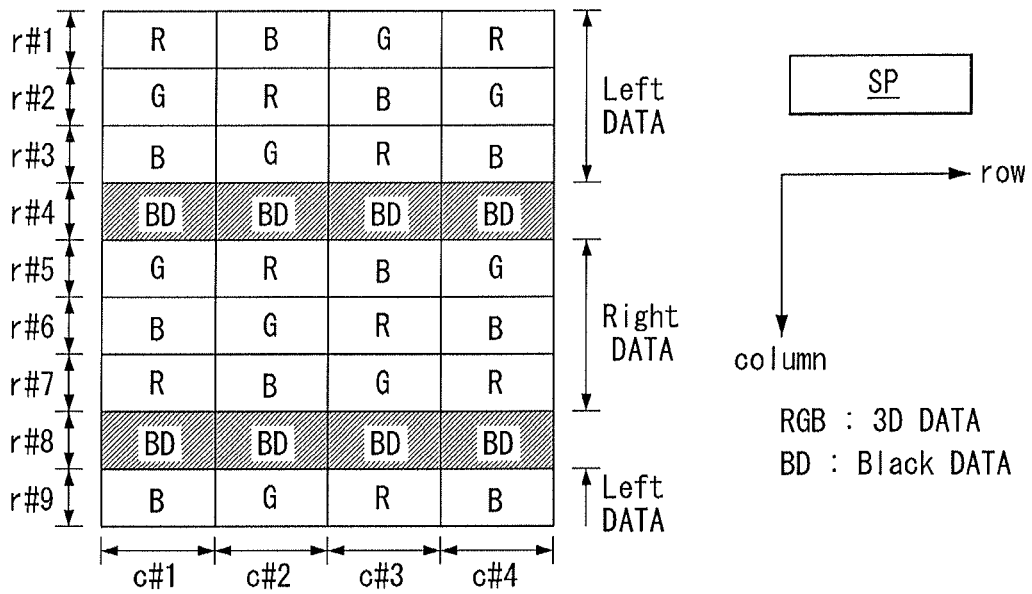

FIGS. 9A and 9B illustrate a second example of a display state of image data based on the first arrangement configuration illustrated in FIGS. 5 to 7.

As shown in FIG. 9A, in the 2D mode, the subpixels of the display panel 11 display the RGB data of the 2D image along the column direction. Further, the (3i−2)th column lines c#1 and c#4, the (3i−1)th column line c#2, and the (3i)th column line c#3 display the RGB data of the 2D image in a different order. As a result, the subpixels of the (3i−2)th row lines r#1, r#4, and r#7 crossing the (3i−2)th column lines c#1 and c#4 display red data R of the 2D image, the subpixels of the (3i−1)th row lines r#2, r#5, and r#8 crossing the (3i−2)th column lines c#1 and c#4 display green data G of the 2D image, and the subpixels of the (3i)th row lines r#3, r#6, and r#9 crossing the (3i−2)th column lines c#1 and c#4 display blue data B of the 2D image. Further, the subpixels of the (3i−2)th row lines r#1, r#4, and r#7 crossing the (3i−1)th column line c#2 display blue data B of the 2D image, the subpixels of the (3i−1)th row lines r#2, r#5, and r#8 crossing the (3i−1)th column line c#2 display red data R of the 2D image, and the subpixels of the (3i)th row lines r#3, r#6, and r#9 crossing the (3i−1)th column line c#2 display green data G of the 2D image. Further, the subpixels of the (3i−2)th row lines r#1, r#4, and r#7 crossing the (3i)th column line c#3 display green data G of the 2D image, the subpixels of the (3i−1)th row lines r#2, r#5, and r#8 crossing the (3i)th column line c#3 display blue data B of the 2D image, and the subpixels of the (3i)th row lines r#3, r#6, and r#9 crossing the (3i)th column line c#3 display red data R of the 2D image.

As shown in FIG. 9B, in the 3D mode, the subpixels of the display panel 11 display the RGB data of the 3D image and black data BD along the column direction. Further, the (3i−2)th column lines c#1 and c#4, the (3i−1)th column line c#2, and the (3i)th column line c#3 display the RGB data of the 3D image in a different order. The black data BD is displayed on the subpixels of the (4i)th row lines r#4 and r#8. The RGB data of the 3D image displayed along the column direction is divided into left eye image data and right eye image data with the (4i)th row lines r#4 and r#8 interposed between the left eye image data and the right eye image data. The left eye image data and the right eye image data on the (3i−2)th column lines c#1 and c#4 are rendered along the column direction in order of left eye RGB data, right eye GBR data, left eye BRG data, right eye RGB data, left eye GBR data, and right eye BRG data. Further, the left eye image data and the right eye image data on the (3i−1)th column line c#2 are rendered along the column direction in order of left eye BRG data, right eye RGB data, left eye GBR data, right eye BRG data, left eye RGB data, and right eye GBR data. Further, the left eye image data and the right eye image data on the (3i)th column line c#3 are rendered along the column direction in order of left eye GBR data, right eye BRG data, left eye RGB data, right eye GBR data, left eye BRG data, and right eye RGB data.

As described above with reference to FIGS. 9A and 9B, the image display device according to the embodiment of the invention displays the 2D image data on all of the subpixels in the 2D mode, thereby preventing a reduction in a luminance of the 2D image. Further, the image display device according to the embodiment of the invention displays the black data BD on the subpixels of the (4i)th row lines r#4 and r#8 and secures a display interval between the left eye image and the right eye image in the 3D mode, thereby widening the vertical viewing angle of the 3D image. The subpixels of the (4i)th row lines r#4 and r#8 display the black data BD only in the 3D mode and serve as an active black stripe. Furthermore, in the second example illustrated in FIGS. 9A and 9B, because the (3i−2)th column lines c#1 and c#4, the (3i−1)th column line c#2, and the (3i)th column line c#3 display the RGB data in the different order, color distortion of the 3D image is prevented.

In the second example illustrated in FIGS. 9A and 9B, the row lines opposite to the first and second retarders RT1 and RT2 individually display the 2D image data in the 2D mode and display the RGB data and the black data BD in the 3D mode, in the same manner as the first example. For this, one or more row line groups each including the three row lines displaying the RGB data are opposite to each of the first and second retarders RT1 and RT2, and the black data BD is displayed on at least one row line.

Because the row line displaying the black data BD in the 3D mode displays the 2D image data in the 2D mode, the row line displaying the black data BD may have the same vertical width as the other row lines.

Figure 10A:
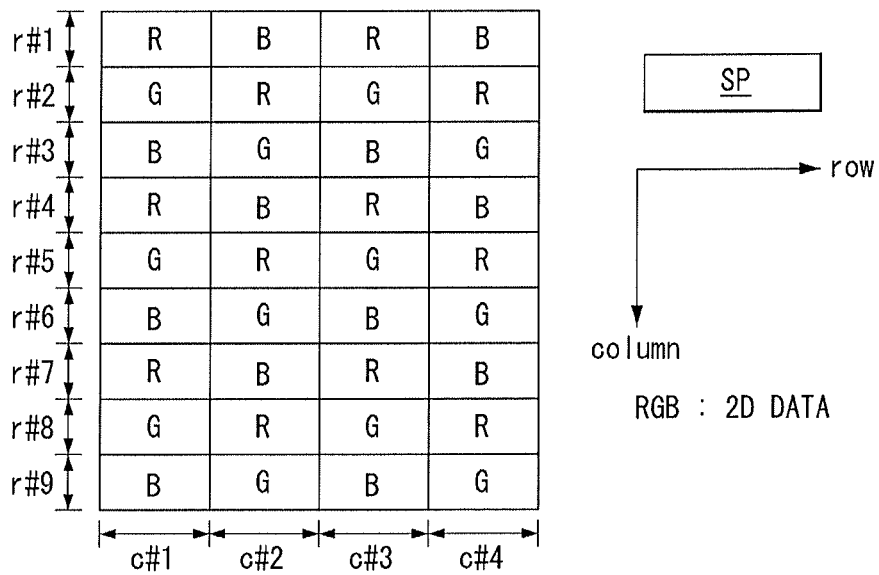
FIGS. 10A and 10B illustrate a third example of a display state of image data based on the first arrangement configuration illustrated in FIGS. 5 to 7.
Figure 10B:
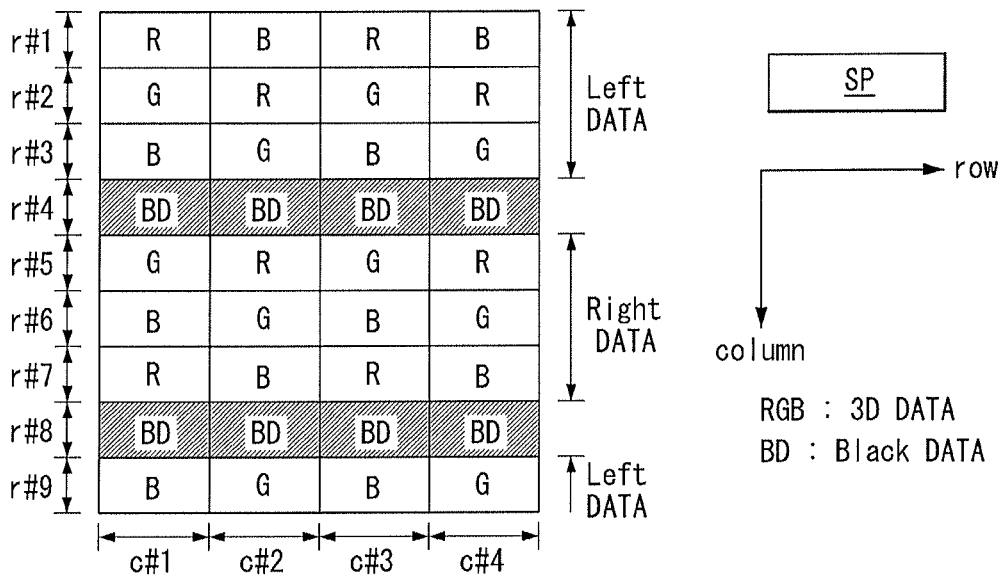

FIGS. 10A and 10B illustrate a third example of a display state of image data based on the first arrangement configuration illustrated in FIGS. 5 to 7.

As shown in FIG. 10A, in the 2D mode, the subpixels of the display panel 11 display the RGB data of the 2D image along the column direction. Further, the (2i–1)th column lines c#1 and c#3 and the (2i)th column lines c#2 and c#4 display the RGB data of the 2D image in a different order. As a result, the subpixels of the (3i–2)th row lines r#1, r#4, and r#7 crossing the (2i–1)th column lines c#1 and c#3 display red data R of the 2D image, the subpixels of the (3i–1)th row lines r#2, r#5, and r#8 crossing the (2i–1)th column lines c#1 and c#3 display green data G of the 2D image, and the subpixels of the (3i)th row lines r#3, r#6, and r#9 crossing the (2i–1)th column lines c#1 and c#3 display blue data B of the 2D image. Further, the subpixels of the (3i–2)th row lines r#1, r#4, and r#7 crossing the (2i)th column lines c#2 and c#4 display blue data B of the 2D image, the subpixels of the (3i–1)th row lines r#2, r#5, and r#8 crossing the (2i)th column lines c#2 and c#4 display red data R of the 2D image, and the subpixels of the (3i)th row lines r#3, r#6, and r#9 crossing the (2i)th column lines c#2 and c#4 display green data G of the 2D image.

As shown in FIG. 10B, in the 3D mode, the subpixels of the display panel 11 display the RGB data of the 3D image and black data BD along the column direction. Further, the (2i–1)th column lines c#1 and c#3 and the (2i)th column lines c#2 and c#4 display the RGB data of the 3D image in a different order. The black data BD is displayed on the subpixels of the (4i)th row lines r#4 and r#8. The RGB data of the 3D image displayed along the column direction is divided into left eye image data and right eye image data with the (4i)th row lines r#4 and r#8 interposed between the left eye image data and the right eye image data. The left eye image data and the right eye image data on the (2i–1)th column lines c#1 and c#3 are rendered along the column direction in order of left eye RGB data, right eye GBR data, left eye BRG data, right eye RGB data, left eye GBR data, and right eye BRG data. Further, the left eye image data and the right eye image data on the (2i)th column lines c#2 and c#4 are rendered along the column direction in order of left eye BRG data, right eye RGB data, left eye GBR data, right eye BRG data, left eye RGB data, and right eye GBR data.

As described above with reference to FIGS. 10A and 10B, the image display device according to the embodiment of the invention displays the 2D image data on all of the subpixels in the 2D mode, thereby preventing a reduction in a luminance of the 2D image. Further, the image display device according to the embodiment of the invention displays the black data BD on the subpixels of the (4i)th row lines r#4 and r#8 and secures a display interval between the left eye image and the right eye image in the 3D mode, thereby widening the vertical viewing angle of the 3D image. The subpixels of the (4i)th row lines r#4 and r#8 display the black data BD only in the 3D mode and serve as an active black stripe. Furthermore, in the third example illustrated in FIGS. 10A and 10B, because the (2i–1)th column lines c#1 and c#3 and the (2i)th column lines c#2 and c#4 display the RGB data in the different order, the color distortion of the 3D image is prevented.

In the third example illustrated in FIGS. 10A and 10B, the row lines opposite to the first and second retarders RT1 and RT2 individually display the 2D image data in the 2D mode and display the RGB data and the black data BD in the 3D mode, in the same manner as the first example. For this, one or more row line groups each including the three row lines displaying the RGB data are opposite to each of the first and second retarders RT1 and RT2, and the black data BD is displayed on at least one row line.

Because the row line displaying the black data BD in the 3D mode displays the 2D image data in the 2D mode, the row line displaying the black data BD may have the same vertical width as the other row lines.

Figure 11A:
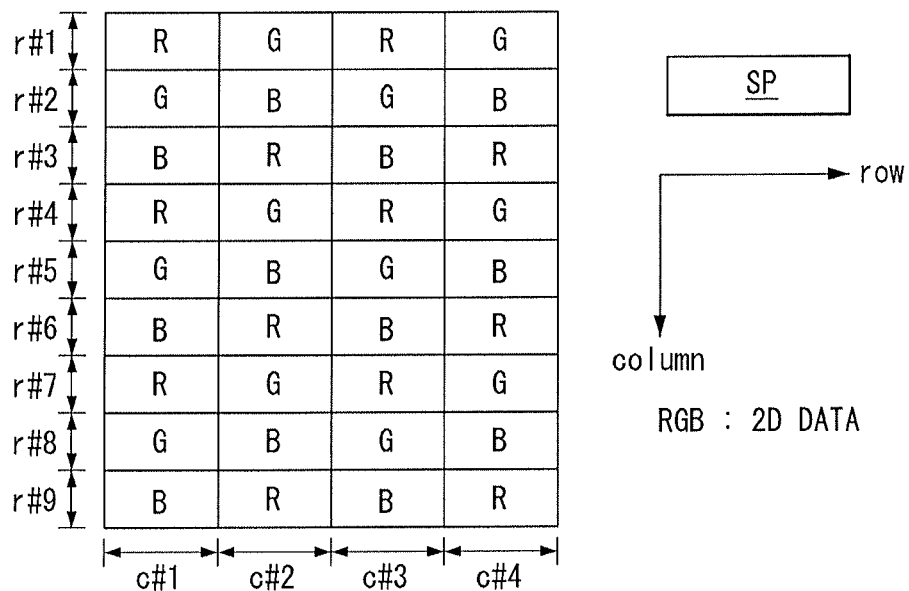
FIGS. 11A and 11B illustrate a fourth example of a display state of image data based on the first arrangement configuration illustrated in FIGS. 5 to 7.
Figure 11B:
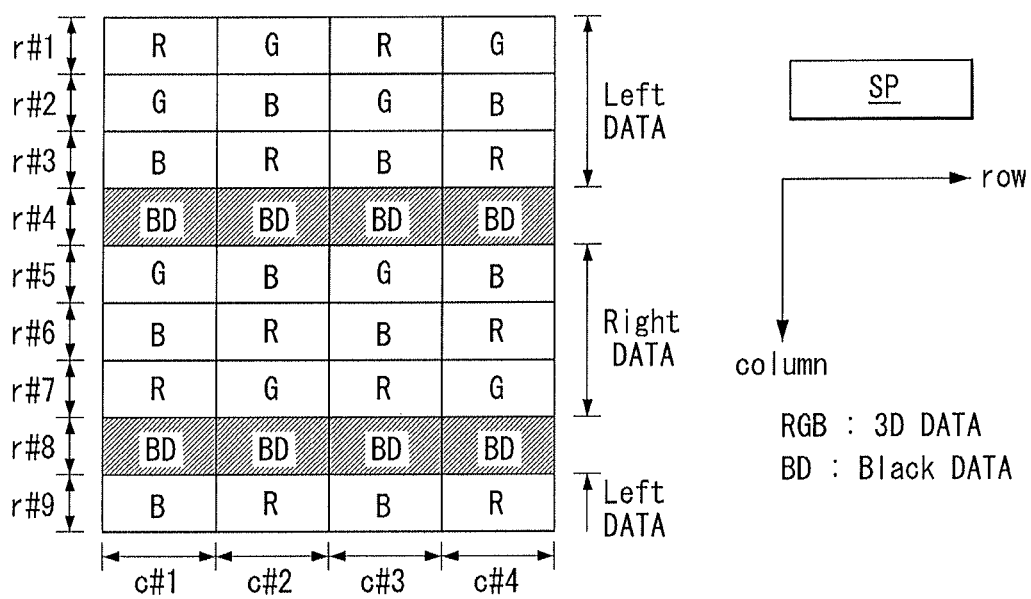

FIGS. 11A and 11B illustrate a fourth example of a display state of image data based on the first arrangement configuration illustrated in FIGS. 5 to 7.

As shown in FIG. 11A, in the 2D mode, the subpixels of the display panel 11 display the RGB data of the 2D image along the column direction. Further, the (2i–1)th column lines c#1 and c#3 and the (2i)th column lines c#2 and c#4 display the RGB data of the 2D image in a different order. As a result, the subpixels of the (3i–2)th row lines r#1, r#4, and r#7 crossing the (2i–1)th column lines c#1 and c#3 display red data R of the 2D image, the subpixels of the (3i–1)th row lines r#2, r#5, and r#8 crossing the (2i–1)th column lines c#1 and c#3 display green data G of the 2D image, and the subpixels of the (3i)th row lines r#3, r#6, and r#9 crossing the (2i–1)th column lines c#1 and c#3 display blue data B of the 2D image. Further, the subpixels of the (3i–2)th row lines r#1, r#4, and r#7 crossing the (2i)th column lines c#2 and c#4 display green data G of the 2D image, the subpixels of the (3i–1)th row lines r#2, r#5, and r#8 crossing the (2i)th column lines c#2 and c#4 display blue data B of the 2D image, and the subpixels of the (3i)th row lines r#3, r#6, and r#9 crossing the (2i)th column lines c#2 and c#4 display red data R of the 2D image.

As shown in FIG. 11B, in the 3D mode, the subpixels of the display panel 11 display the RGB data of the 3D image and black data BD along the column direction. Further, the (2i–1)th column lines c#1 and c#3 and the (2i)th column lines c#2 and c#4 display the RGB data of the 3D image in a different order. The black data BD is displayed on the subpixels of the (4i)th row lines r#4 and r#8. The RGB data of the 3D image displayed along the column direction is divided into left eye image data and right eye image data with the (4i)th row lines r#4 and r#8 interposed between the left eye image data and the right eye image data. The left eye image data and the right eye image data on the (2i–1)th column lines c#1 and c#3 are rendered along the column direction in order of left eye RGB data, right eye GBR data, left eye BRG data, right eye RGB data, left eye GBR data, and right eye BRG data. Further, the left eye image data and the right eye image data on the (2i)th column lines c#2 and c#4 are rendered along the column direction in order of left eye GBR data, right eye BRG data, left eye RGB data, right eye GBR data, left eye BRG data, and right eye RGB data.

As described above with reference to FIGS. 11A and 11B, the image display device according to the embodiment of the invention displays the 2D image data on all of the subpixels in the 2D mode, thereby preventing a reduction in a luminance of the 2D image. Further, the image display device according to the embodiment of the invention displays the black data BD on the subpixels of the (4i)th row lines r#4 and r#8 and secures a display interval between the left eye image and the right eye image in the 3D mode, thereby widening the vertical viewing angle of the 3D image. The subpixels of the (4i)th row lines r#4 and r#8 display the black data BD only in the 3D mode and serve as an active black stripe. Furthermore, in the fourth example illustrated in FIGS. 11A and 11B, because the (2i–1)th column lines c#1 and c#3 and the (2i)th column lines c#2 and c#4 display the RGB data in the different order, the color distortion of the 3D image is prevented.

In the fourth example illustrated in FIGS. 11A and 11B, the row lines opposite to the first and second retarders RT1 and RT2 individually display the 2D image data in the 2D mode and display the RGB data and the black data BD in the 3D mode, in the same manner as the first example. For this, one or more row line groups each including the three row lines displaying the RGB data are opposite to each of the first and second retarders RT1 and RT2, and the black data BD is displayed on at least one row line.

Because the row line displaying the black data BD in the 3D mode displays the 2D image data in the 2D mode, the row line displaying the black data BD may have the same vertical width as the other row lines.

Figure 12:
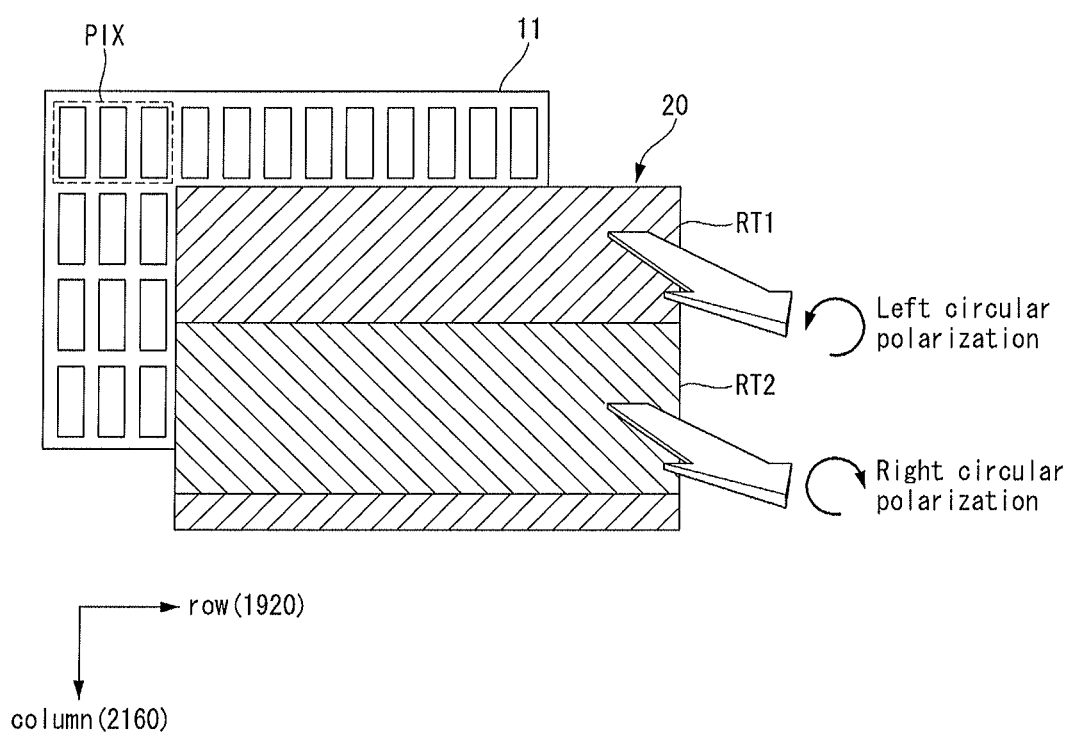
FIGS. 12 to 14 illustrate a second arrangement configuration of RGB subpixels and an alignment state of a patterned retarder corresponding to the second arrangement configuration.
Figure 13:
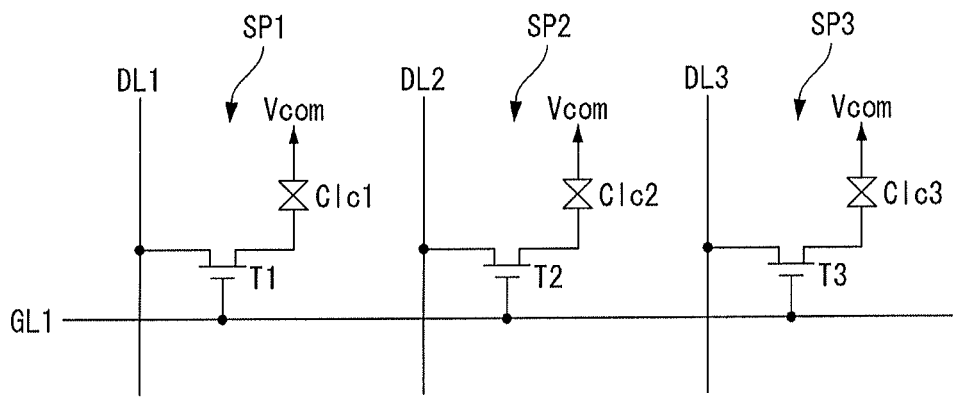
Figure 14:
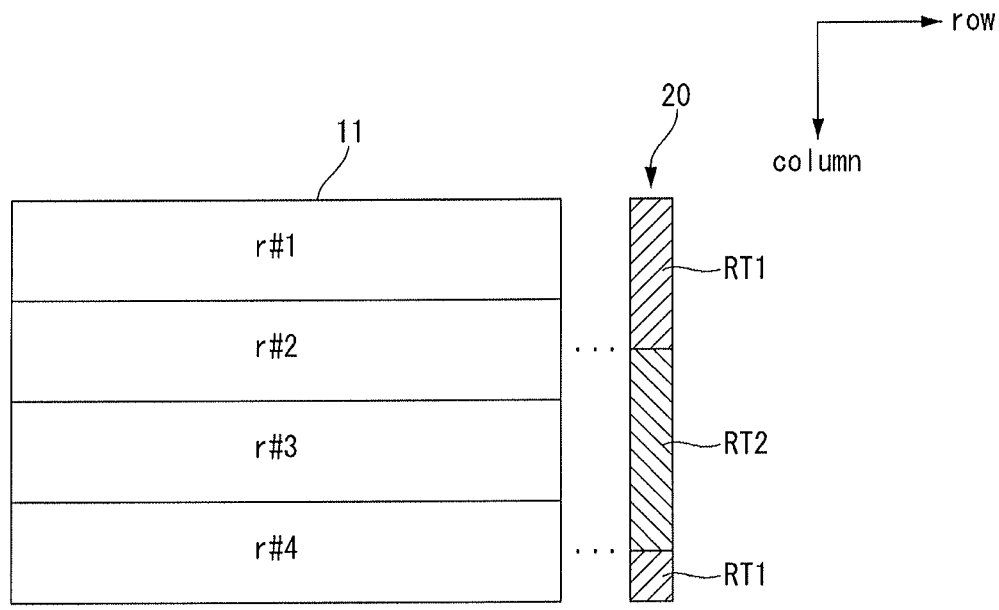

FIGS. 12 to 14 illustrate a second arrangement configuration of RGB subpixels and an alignment state of a patterned retarder corresponding to the second arrangement configuration.

The subpixels constituting the pixel array include red subpixels each including a red color filter, green subpixels each including a green color filter, and blue subpixels each including a blue color filter. As shown in FIGS. 12 to 14, the red subpixel, the green subpixel, and the blue subpixel are sequentially disposed along the row direction, thereby constituting a unit pixel PIX. Three data lines and one gate line are assigned to the unit pixel PIX. For example, in the unit pixel PIX illustrated in FIG. 13, a first subpixel SP1 is formed at a crossing between a data line DL1 and a gate line GL1 and displays a red image, a second subpixel SP2 is formed at a crossing between a data line DL2 and the gate line GL1 and displays a green image, and a third subpixel SP3 is formed at a crossing between a data line DL3 and the gate line GL1 and displays a blue image.

The pixel array according to the second arrangement configuration is characterized in that a vertical resolution (corresponding to the number of gate lines) of the column direction is greater than a general vertical resolution. For example, when the horizontal resolution is '1920' of a full-HD resolution of 1920×1080, the vertical resolution may be determined as '2160' corresponding to two times '1080' of the full-HD resolution.

The patterned retarder 20 is aligned on the display panel 10, so that it divides polarized light every two row lines. A plurality of first retarders RT1 and a plurality of second retarders RT2 of the patterned retarder 20 are alternately disposed along the column direction. Each of the first retarder RT1 and the second retarder RT2 is formed along the row direction in an elongated manner along an entire row, for example. Boundary portions between the first retarders RT1 and the second retarders RT2 may overlap (2i−1)th row lines, respectively. For example, as shown in FIG. 14, the boundary portions between the first retarders RT1 and the second retarder RT2 may overlap the second and fourth row lines r#2 and r#4, respectively. As a result, the first retarder RT1 is positioned opposite the first row line r#1, and the second retarder RT2 is positioned opposite the third row line r#3.

The first retarders RT1 and the second retarders RT2 are not limited to the configuration illustrated in FIGS. 12 to 14. For example, the first retarder RT1 may overlap the first and second row lines r#1 and r#2, and the second retarder RT2 may overlap the third and fourth row lines r#3 and r#4. In this instance, the boundary portions between the first retarders RT1 and the second retarder RT2 may overlap boundary portions (2i)th row lines and (2i−1)th row lines, respectively.

Figure 15A:
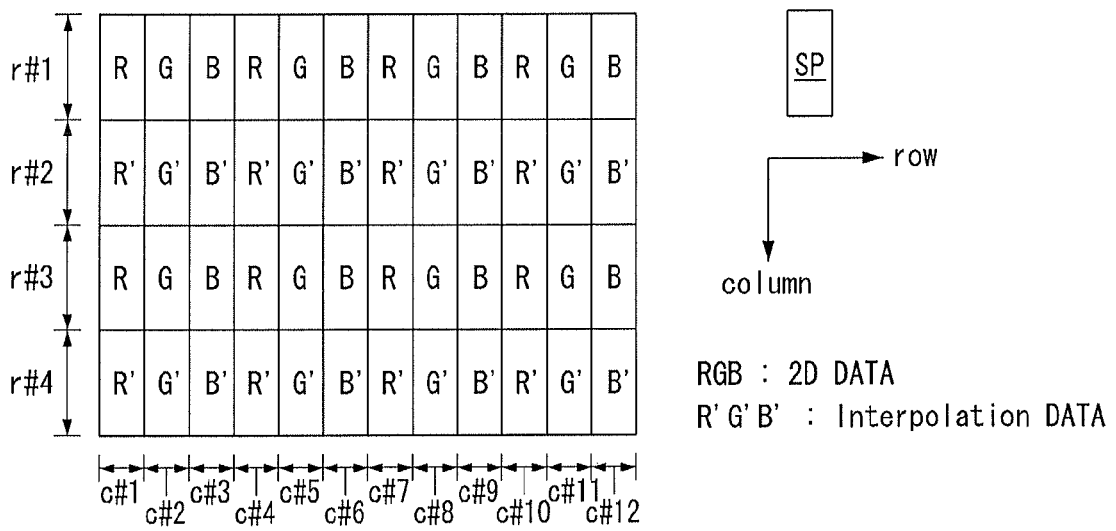
FIGS. 15A and 15B illustrate a display state of image data based on the second arrangement configuration illustrated in FIGS. 12 to 14.
Figure 15B:
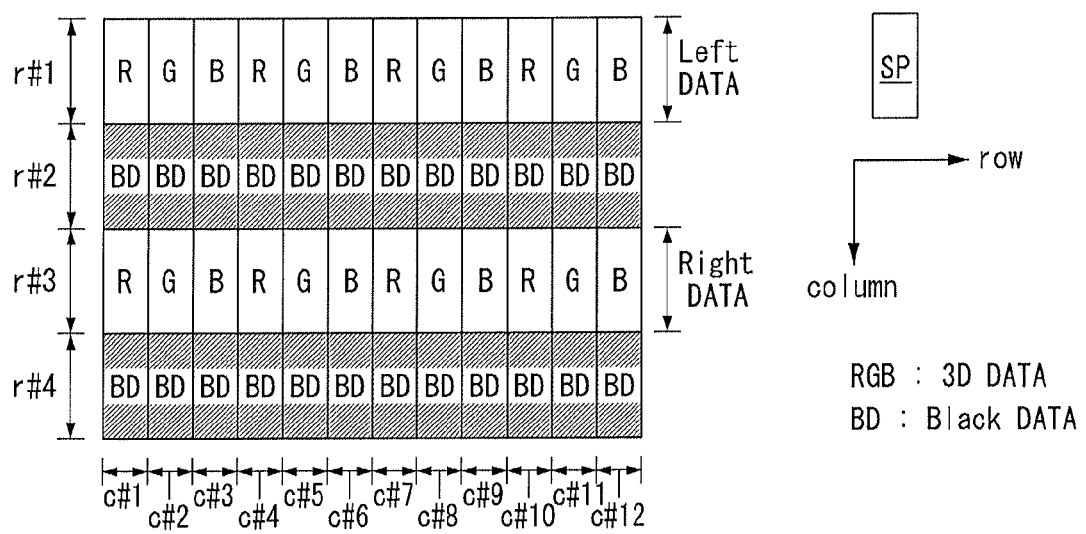

FIGS. 15A and 15B illustrate a display state of image data based on the second arrangement configuration illustrated in FIGS. 12 to 14.

As shown in FIG. 15A, in the 2D mode, the subpixels of the remaining row lines (i.e., the odd-numbered row lines) r#1 and r#3 except the (2i)th row lines (i.e., the even-numbered row lines) r#2 and r#4 display the RGB data of the 2D image along the row direction, and the subpixels of the (2i)th row lines r#2 and r#4 display RGB interpolation data of the 2D image along the row direction.

In other words, the subpixels of the (3i−2)th column lines c#1, c#4, c#7, and c#10 crossing the odd-numbered row lines r#1 and r#3 display red data R of the 2D image, the subpixels of the (3i−1)th column lines c#2, c#5, c#8, and c#11 crossing the odd-numbered row lines r#1 and r#3 display green data G of the 2D image, and the subpixels of the (3i)th column lines c#3, c#6, c#9, and c#12 crossing the odd-numbered row lines r#1 and r#3 display blue data B of the 2D image.

Further, the subpixels of the (3i−2)th column lines c#1, c#4, c#7, and c#10 crossing the even-numbered row lines r#2 and r#4 display red interpolation data R' of the 2D image, the subpixels of the (3i−1)th column lines c#2, c#5, c#8, and c#11 crossing the even-numbered row lines r#2 and r#4 display green interpolation data G' of the 2D image, and the subpixels of the (3i)th column lines c#3, c#6, c#9, and c#12 crossing even-numbered row lines r#2 and r#4 display blue interpolation data B' of the 2D image.

The interpolation data R', G', and B' may be the same data as the RGB data to be displayed on the odd-numbered row lines, or may be data of the odd-numbered row lines produced through interpolation algorithms so as to improve the picture quality. Further, the interpolation data R', G', and B' may be different RGB image data for displaying more information because the vertical resolution is doubled.

As shown in FIG. 15B, in the 3D mode, the subpixels of the display panel 11 display the RGB data of the 3D image and the black data BD along the row direction. The black data BD is displayed on the subpixels of the (2i)th row lines r#2 and r#4. The RGB data of the 3D image displayed along the row direction is divided into left eye image data and right eye image data with the (2i)th row lines r#2 and r#4 interposed between the left eye image data and the right eye image data.

As described above with reference to FIGS. 15A and 15B, the image display device according to the embodiment of the invention individually displays the 2D image data on all of the subpixels in the 2D mode, thereby preventing a reduction in a luminance of the 2D image. Further, the image display device according to the embodiment of the invention displays the black data BD on the subpixels of the (2i)th row lines and secures a display interval between the left eye image and the right eye image in the 3D mode, thereby widening the vertical viewing angle of the 3D image. The subpixels of the (2i)th row lines r#2 and r#4 display the black data BD only in the 3D mode and serve as an active black stripe.

In the second arrangement configuration according to the embodiment of the invention, the row lines are divided into the odd-numbered row lines and the even-numbered row lines, and the RGB data of the 3D image and the black data BD are alternately displayed on the row lines every one row line in the 3D mode. The embodiment of the invention is not limited thereto. For example, each of the first and second retarders RT1 and RT2 may be positioned opposite at least two row lines. Further, each of the first and second retarders RT1 and RT2 may be positioned opposite at least one row line to display the left or right eye image data and at least one row line to display the black data BD in the 3D mode.

At least one row line to display the black data BD displays the RGB image data in the 2D mode and may include a portion of the row line to display the black data BD in the 3D mode. The luminance of the 3D image may be improved and the crosstalk of the 3D image may be reduced by properly adjusting the number of row lines to display the black data BD.

Because the row line displaying the black data BD in the 3D mode displays the 2D image data in the 2D mode, the row line displaying the black data BD may have the same vertical width as the other row lines.

Figure 16:
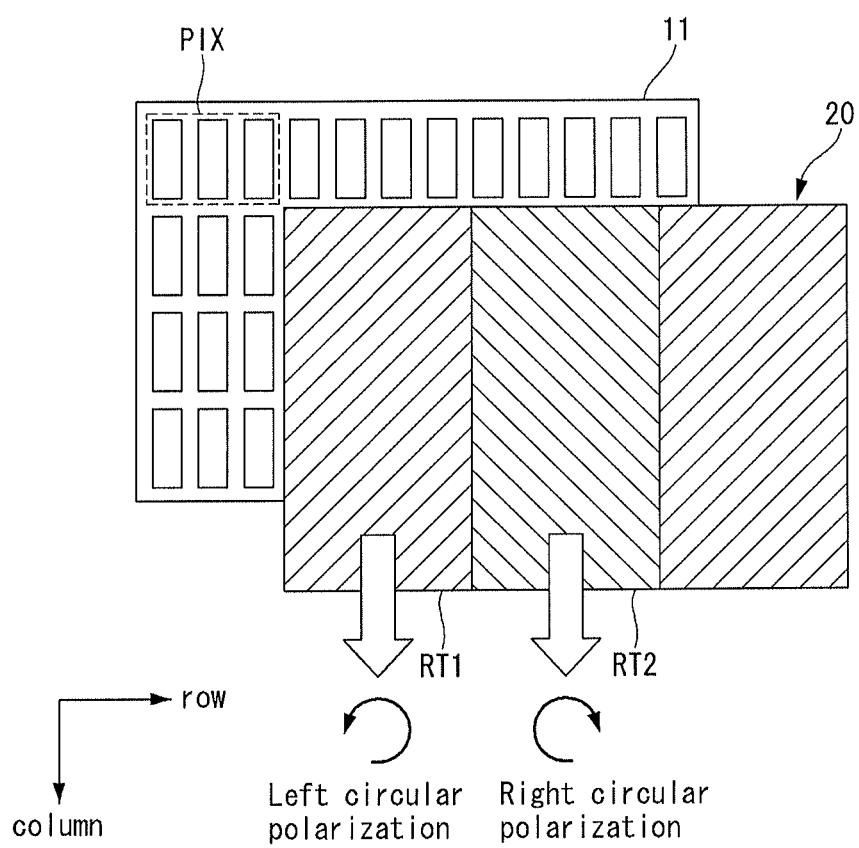
FIGS. 16 to 18 illustrate a third arrangement configuration of RGB subpixels and an alignment state of a patterned retarder corresponding to the third arrangement configuration.
Figure 17:
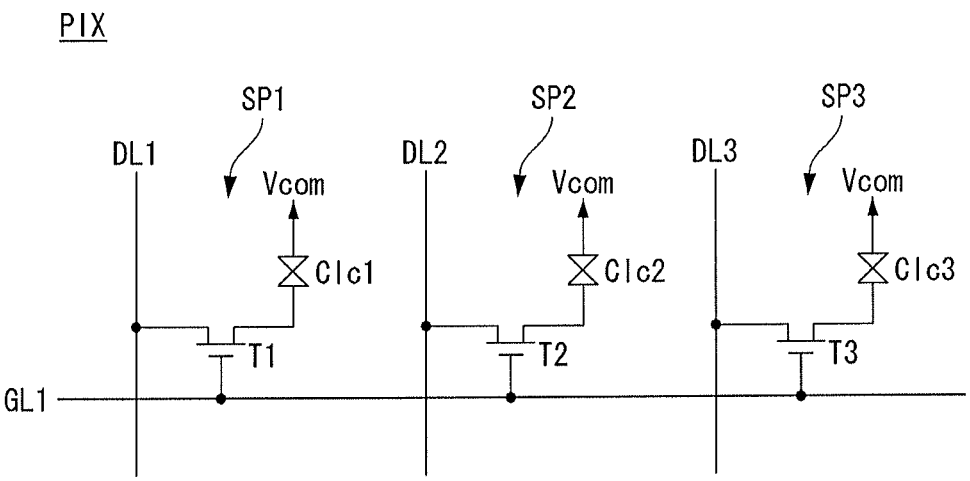
Figure 18:
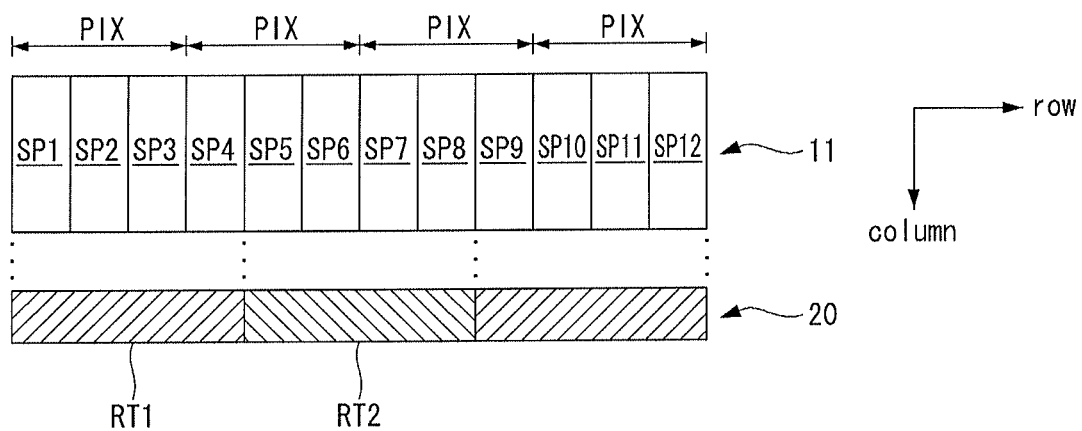

FIGS. 16 to 18 illustrate a third arrangement configuration of RGB subpixels and an alignment state of a patterned retarder corresponding to the third arrangement configuration.

The subpixels constituting the pixel array include red subpixels each including a red color filter, green subpixels each including a green color filter, and blue subpixels each including a blue color filter. As shown in FIGS. 16 to 18, the red subpixel, the green subpixel, and the blue subpixel are sequentially disposed along the row direction, thereby constituting a unit pixel PIX. Three data lines and one gate line are assigned to the unit pixel PIX. For example, in the unit pixel PIX illustrated in FIG. 17, a first subpixel SP1 is formed at a crossing between a data line DL1 and a gate line GL1 and displays a red image, a second subpixel SP2 is formed at a crossing between a data line DL2 and the gate line GL1 and displays a green image, and a third subpixel SP3 is formed at a crossing between a data line DL3 and the gate line GL1 and displays a blue image.

The patterned retarder 20 is aligned on the display panel 10, so that it divides polarized light every four column lines. A plurality of first retarders RT1 and a plurality of second retarders RT2 of the patterned retarder 20 are alternately disposed along the row direction. Each of the first retarder RT1 and the second retarder RT2 is formed along the column direction in an elongated manner along an entire column, for example. Each of the first retarder RT1 and the second retarder RT2 is opposite to four column lines. For example, as shown in FIG. 18, when the first retarder RT1 is opposite to four column lines including first to fourth subpixels SP1 to SP4, the second retarder RT2 may be opposite to four column lines including fifth to eighth subpixels SP5 to SP8.

Figure 19A:
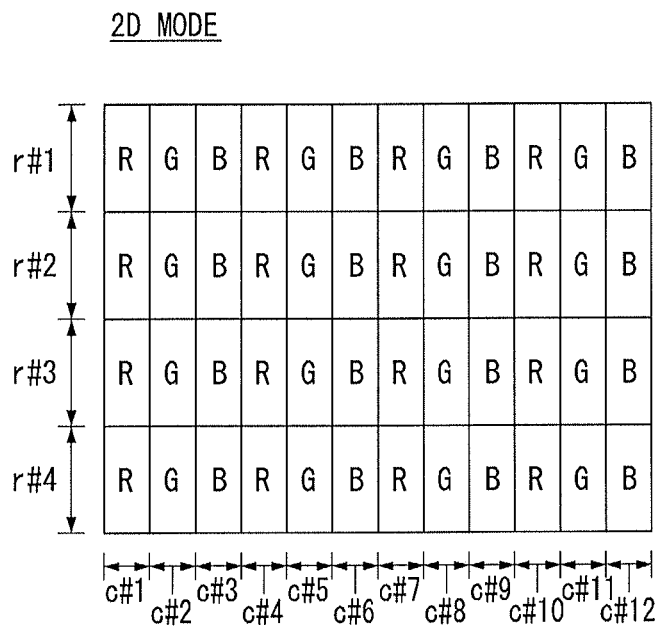
FIGS. 19A and 19B illustrate a display state of image data based on the third arrangement configuration illustrated in FIGS. 16 to 18.
Figure 19A:
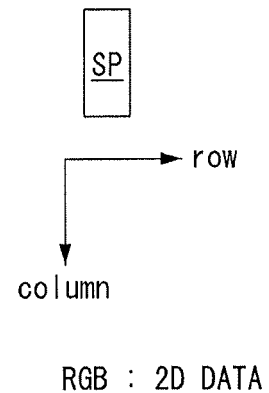
Figure 19B:
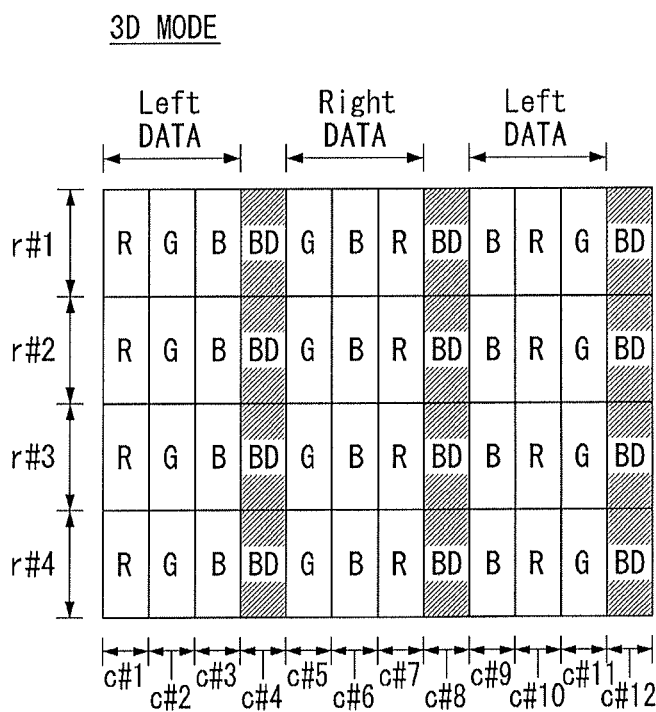
Figure 19B:
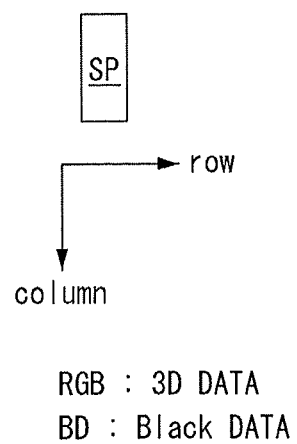

FIGS. 19A and 19B illustrate a display state of image data based on the third arrangement configuration illustrated in FIGS. 16 to 18.

As shown in FIG. 19A, in the 2D mode, the subpixels of the display panel 11 display the RGB data of the 2D image along the row direction. In other words, the subpixels of the (3i−2)th column lines c#1, c#4, c#7, and c#10 crossing the row lines r#1 to r#4 display red data R of the 2D image, the subpixels of the (3i−1)th column lines c#2, c#5, c#8, and c#11 crossing the row lines r#1 to r#4 display green data G of the 2D image, and the subpixels of the (3i)th column lines c#3, c#6, c#9, and c#12 crossing the row lines r#1 to r#4 display blue data B of the 2D image.

As shown in FIG. 19B, in the 3D mode, the subpixels of the display panel 11 display the RGB data of the 3D image and black data BD along the row direction. The black data BD is displayed on the subpixels of the (4i)th column lines c#4, c#8, and c#12. The RGB data of the 3D image displayed along the column direction is divided into left eye image data and right eye image data with the (4i)th column lines c#4, c#8, and c#12 interposed between the left eye image data and the right eye image data. The left eye image data and the right eye image data on all of the row lines r#1 to r#4 are rendered along the row direction in order of left eye RGB data, right eye GBR data, left eye BRG data, right eye RGB data, left eye GBR data, and right eye BRG data.

As described above with reference to FIGS. 19A and 19B, the image display device according to the embodiment of the invention displays the 2D image data on all of the subpixels in the 2D mode, thereby preventing a reduction in a luminance of the 2D image. Further, the image display device according to the embodiment of the invention displays the black data BD on the subpixels of the (4i)th column lines c#4, c#8, and c#12 and secures a display interval between the left eye image and the right eye image in the 3D mode, thereby widening a horizontal viewing angle of the 3D image. The subpixels of the (4i)th column lines c#4, c#8, and c#12 display the black data BD only in the 3D mode and serve as an active black stripe.

The third arrangement configuration according to the embodiment of the invention describes the first and second retarders RT1 and RT2, each of which is opposite to the four column lines, and does not limit the number of column lines opposite to each of the first and second retarders RT1 and RT2. For example, each of the first and second retarders RT1 and RT2 may be opposite to the four or more column lines. In this instance, the image display device according to the embodiment of the invention individually displays the 2D image data on all of the subpixels in the 2D mode, thereby preventing a reduction in the luminance of the 2D image. Further, the image display device according to the embodiment of the invention displays the RGB data of one of the left and right eye images on three or more column lines and displays the black data BD on the remaining one or more column lines in the 3D mode.

The number of column lines displaying the black data BD may be two or more. In this instance, the image display device according to the embodiment of the invention may further reduce a horizontal crosstalk. The column line displaying the black data BD may be at least one column line displaying the 2D image in the 2D mode.

Accordingly, each of the first and second retarders RT1 and RT2 is positioned opposite the column lines displaying the RGB data of one of the left and right eye images. Further, each of the first and second retarders RT1 and RT2 is positioned opposite the column lines, which displays the 2D image data in the 2D mode and displays the black data BD in the 3D mode.

The number of column lines, which are opposite to each of one first retarder RT1 and one second retarder RT2 and display the RGB data of one of the left and right eye images in the 3D mode, is not limited to three. For example, the three column lines may form a column line group, and the RGB data of the left eye image displayed on two or more column line groups and the RGB data of the right eye image displayed on two or more column line groups may be alternately disposed. In this instance, the embodiment of the invention may be configured such that the RGB data of the left eye image—the RGB data of the left eye image—the black data BD or the RGB data of the right eye image—the RGB data of the right eye image—the black data BD are opposite to one of the first and second retarders RT1 and RT2. The image display device according to the embodiment of the invention may further improve the luminance of the 3D image in the 3D mode through the configuration.

In other words, in the third arrangement configuration according to the embodiment of the invention, each of the first and second retarders RT1 and RT2 is opposite to at least four column lines, and the column lines individually display the 2D image data in the 2D mode. In the 3D mode, one or more column line groups each including the three column lines displaying the RGB data are opposite to each of the first and second retarders RT1 and RT2, and the black data BD is displayed on at least one column line.

Because the column line displaying the black data BD in the 3D mode displays the 2D image data in the 2D mode, the column line displaying the black data BD may have the same horizontal width as the other column lines.

As described above, the image display device according to the embodiment of the invention determines the alignment state of the patterned retarder based on the arrangement configuration of the RGB subpixels and adjusts data applied to the subpixels, thereby preventing a reduction in the luminances of the 2D image and widening the vertical viewing angle of the 3D image.

In various embodiments, an image display device is provided. The image display device may include a display element including a pixel array including a plurality of subpixels, each of which is formed at each of crossings of column lines and row lines, the display element selectively implementing a 2D image and a 3D image; wherein, when the 2D image is implemented, all of the subpixels display 2D image data, wherein a plurality of subpixels is grouped to respective first pixels; wherein each subpixel represents a color component of a pixel; wherein when the 3D image is implemented, a plurality of subpixels is grouped to respective second pixels, wherein in at least some of the second pixels, one or more color component subpixels are replaced by one or more other color component subpixels not being included in the respective first pixel; and wherein second pixels of a left eye image in the 3D image are separated from second pixels of a right eye image in the 3D image by means of at least one subpixel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An image display device comprising:
a display element including a pixel array including a plurality of subpixels, which are respectively formed at crossings of column lines and row lines, the display element selectively implementing a 2D image and a 3D image; and
a patterned retarder including a plurality of first retarders, each of which transmits light from the display element as a first polarization component, and a plurality of second retarders, each of which transmits the light from the display element as a second polarization component, the plurality of first retarders and the plurality of second retarders being alternatively arranged,
wherein when the 2D image is implemented, all of the subpixels display 2D image data,
wherein when the 3D image is implemented, subpixels of (4i)th row lines display black data, where 'i' is a positive integer, subpixels of three adjacent row lines on the upper side of each of the (4i)th row lines display 3D image data of one of left and right eye images of the 3D image, and subpixels of three adjacent row lines on the lower side of each of the (4i)th row lines display 3D image data of the other of the left and right eye images,
wherein a red subpixel, a green subpixel, and a blue subpixel of the pixel array are sequentially disposed along a column direction to constitute a unit pixel.

2. The image display device of claim 1, wherein the patterned retarder is aligned on the display element, so that it divides polarized light every four row lines,
wherein each of the first retarder and the second retarder is opposite to four row lines.

3. The image display device of claim 1, wherein when the 2D image is implemented, the subpixels of the pixel array display RGB data of the 2D image along the column direction, and a display order of the RGB data of the 2D image is the same in all of the column lines,
wherein when the 3D image is implemented, the subpixels of the pixel array display RGB data of the 3D image and the black data along the column direction, and a display order of the RGB data of the 3D image is the same in all of the column lines.

4. The image display device of claim 3, wherein the RGB data of the 3D image is divided into left eye image data and right eye image data with the (4i)th row lines interposed between the left eye image data and the right eye image data,
wherein the left eye image data and the right eye image data on all of the column lines are rendered along the column direction in order of left eye RGB data, right eye GBR data, left eye BRG data, right eye RGB data, left eye GBR data, and right eye BRG data.

5. The image display device of claim 1, wherein when the 2D image is implemented, the subpixels of the pixel array display RGB data of the 2D image along the column direction, and (3i−2)th column lines, (3i−1)th column lines, and (3i)th column lines display the RGB data of the 2D image in a different order,
wherein when the 3D image is implemented, the subpixels of the pixel array display RGB data of the 3D image and the black data along the column direction, and the (3i−2)th column lines, the (3i−1)th column lines, and the (3i)th column lines display the RGB data of the 3D image in a different order.

6. The image display device of claim 5, wherein the RGB data of the 3D image is divided into left eye image data and right eye image data with the (4i)th row lines interposed between the left eye image data and the right eye image data,
wherein the left eye image data and the right eye image data on the (3i−2)th column lines are rendered along the column direction in order of left eye RGB data, right eye GBR data, left eye BRG data, right eye RGB data, left eye GBR data, and right eye BRG data,
wherein the left eye image data and the right eye image data on the (3i−1)th column lines are rendered along the column direction in order of left eye BRG data, right eye RGB data, left eye GBR data, right eye BRG data, left eye RGB data, and right eye GBR data,
wherein the left eye image data and the right eye image data on the (3i)th column lines are rendered along the column direction in order of left eye GBR data, right eye BRG data, left eye RGB data, right eye GBR data, left eye BRG data, and right eye RGB data.

7. The image display device of claim 1, wherein when the 2D image is implemented, the subpixels of the pixel array display RGB data of the 2D image along the column direction, and (2i−1)th column lines and (2i)th column lines display the RGB data of the 2D image in a different order,
wherein when the 3D image is implemented, the subpixels of the pixel array display RGB data of the 3D image and the black data along the column direction, and the (2i−1)th column lines and the (2i)th column lines display the RGB data of the 3D image in a different order.

8. The image display device of claim 7, wherein the RGB data of the 3D image is divided into left eye image data and right eye image data with the (4i)th row lines interposed between the left eye image data and the right eye image data, wherein the left eye image data and the right eye image data on the (2i−1)th column lines are rendered along the column direction in order of left eye RGB data, right eye GBR data, left eye BRG data, right eye RGB data, left eye GBR data, and right eye BRG data, wherein the left eye image data and the right eye image data on the (2i)th column lines are rendered along the column direction in order of left eye BRG data, right eye RGB data, left eye GBR data, right eye BRG data, left eye RGB data, and right eye GBR data.

9. The image display device of claim 7, wherein the RGB data of the 3D image is divided into left eye image data and right eye image data with the (4i)th row lines interposed between the left eye image data and the right eye image data, wherein the left eye image data and the right eye image data on the (2i−1)th column lines are rendered along the column direction in order of left eye RGB data, right eye GBR data, left eye BRG data, right eye RGB data, left eye GBR data, and right eye BRG data, wherein the left eye image data and the right eye image data on the (2i)th column lines are rendered along the column direction in order of left eye GBR data, right eye BRG data, left eye RGB data, right eye GBR data, left eye BRG data, and right eye RGB data.

10. The image display device of claim 1, wherein the subpixels of the (4i)th row lines display one of a red data, a green data, and a blue data different from an adjacent subpixel along the column direction when the 2D image is implemented and display the black data when the 3D image is implemented.

11. An image display device comprising:
a display element including a pixel array including a plurality of subpixels, which are respectively formed at crossings of column lines and row lines, the display element selectively implementing a 2D image and a 3D image; and
a patterned retarder including a plurality of first retarders, each of which transmits light from the display element as a first polarization component, and a plurality of second retarders, each of which transmits the light from the display element as a second polarization component, the plurality of first retarders and the plurality of second retarders being alternatively arranged, wherein when the 2D image is implemented, all of the subpixels display 2D image data, wherein when the 3D image is implemented, subpixels of (4i)th column lines display black data, where 'i' is a positive integer, subpixels of three adjacent column lines on the left side of each of the (4i)th column lines display 3D image data of one of left and right eye images of the 3D image, and subpixels of three adjacent column lines on the right side of each of the (4i)th column lines display 3D image data of the other of the left and right eye images, wherein when the 2D image is implemented, the subpixels of the pixel array display RGB data of the 2D image along a row direction, wherein when the 3D image is implemented, the subpixels of the pixel array display RGB data of the 3D image and the black data along the row direction, and wherein the RGB data of the 3D image is divided into left eye image data and right eye image data with the (4i)th column lines interposed between the left eye image data and the right eye image data.

12. The image display device of claim 11, wherein a red subpixel, a green subpixel, and a blue subpixel of the pixel array are sequentially disposed along the row direction to constitute a unit pixel.

13. The image display device of claim 11, wherein the patterned retarder is aligned on the display element, so that it divides polarized light every four column lines, wherein each of the first retarder and the second retarder is opposite to four column lines.

* * * * *